J. GLANZ.
PNEUMATIC TIRE PLUG.
APPLICATION FILED JAN. 9, 1909.

931,056.

Patented Aug. 17, 1909.

Witnesses:
Harry C. Hebig
M. E. Campion.

Joseph Glanz Inventor
By his Attorney
James Hamilton

UNITED STATES PATENT OFFICE.

JOSEPH GLANZ, OF HARTFORD, CONNECTICUT.

PNEUMATIC-TIRE PLUG.

No. 931,056.  Specification of Letters Patent.  Patented Aug. 17, 1909.

Application filed January 9, 1909. Serial No. 471,396.

*To all whom it may concern:*

Be it known that I, JOSEPH GLANZ, a citizen of the United States, residing at Hartford, in the county of Hartford and State of Connecticut, have invented certain new and useful Improvements in Pneumatic-Tire Plugs, of which the following is a specification, reference being had to the accompanying drawings.

My invention relates to improvements in pneumatic tire plugs; and an object of my invention is to provide a plug of the character described which will be simple in construction, comparatively cheap in manufacture, efficient in use and readily applied.

Figure 1:
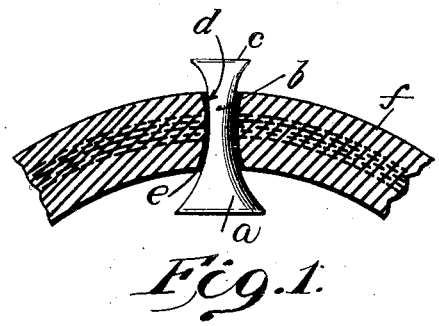
Figure 3:
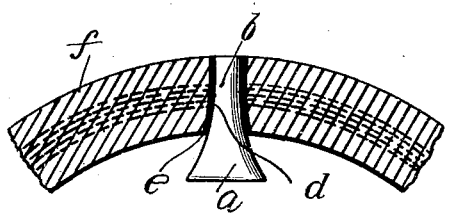
Figure 2:
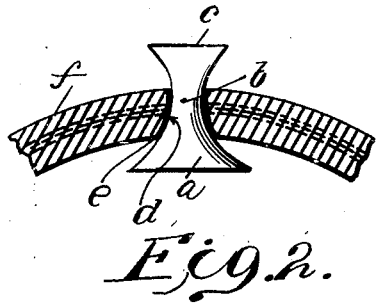
Figure 4:
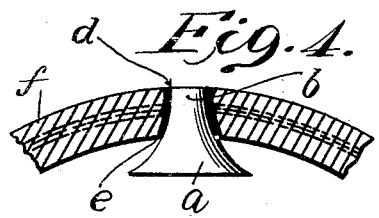
Figure 5:
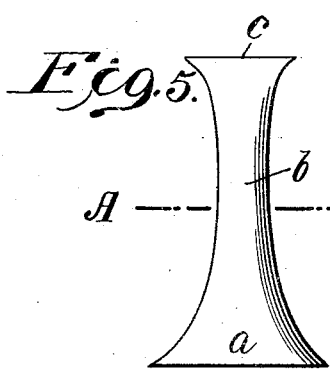
Figure 6:
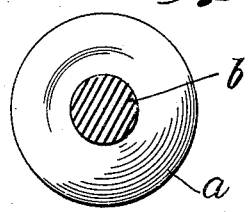

In the drawings illustrating the principle of my invention and the best mode now known to me of applying that principle, Figure 1 is a view showing the plug in place before the top is clipped off; Fig. 2 is a view similar to Fig. 1 showing a plug of larger size; Figs. 3 and 4 are views showing the plugs of Figs. 1 and 2, respectively, with the tops clipped off; Fig. 5 is an elevation of a tire plug embodying my invention; and Fig. 6 is a section on the line A—A of Fig. 5.

My new tire plug is preferably formed with an enlarged base portion $a$, a reduced mid-portion $b$ and a head or top portion $c$ which is of smaller diameter than the base portion $a$. My new tire plug is made in several sizes and is, therefore, a graded plug, whereby the tire plug may be selected with a view to the size of the puncture or opening made in the tire.

In repairing the tire $f$, cement $e$ is first forced into the puncture $d$, after which the large end $a$ of the plug is pushed into the tire through the puncture $d$, by pressing upon it with a wire or like device; and since my new tire plug is made of soft rubber, it may be so forced into the tire without enlarging the hole therein. Further, the cement makes the plug slip in more easily, acting as a lubricant. The head or top portion $c$ tends to prevent the plug being forced bodily through the hole into the tire and thereby retains the plug in place, while the puncture is being repaired. After the plug is in place, more cement may be applied to it, if desired, but this is generally unnecessary. The top $c$ is clipped off, as shown in Figs. 3 and 4, leaving the surface of the tire $f$ smooth. If so desired, the plug may be made in the form shown in Figs. 3 and 4; that is, the top portion $c$ may be omitted.

I claim:

A puncture plug for pneumatic tires formed with a centrally reduced body portion and having ends which diverge or flare outwardly on a curve from said reduced body portion and the bases of which are substantially flat.

In testimony whereof I have hereunto set my hand at said Hartford this 7th day of January, A. D., 1909, in the presence of the two undersigned witnesses.

JOSEPH GLANZ.

Witnesses:
 PETER SCOTT,
 JAMES E. HAMILTON.